US010565253B2

(12) United States Patent
Zou et al.

(10) Patent No.: US 10,565,253 B2
(45) Date of Patent: Feb. 18, 2020

(54) MODEL GENERATION METHOD, WORD WEIGHTING METHOD, DEVICE, APPARATUS, AND COMPUTER STORAGE MEDIUM

(71) Applicant: BAIDU ONLINE NETWORK TECHNOLOGY (BEIJING) CO., LTD., Beijing (CN)

(72) Inventors: Hongjian Zou, Beijing (CN); Gaolin Fang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 419 days.

(21) Appl. No.: 15/319,555

(22) PCT Filed: Jun. 1, 2016

(86) PCT No.: PCT/CN2016/084312
§ 371 (c)(1),
(2) Date: Dec. 16, 2016

(87) PCT Pub. No.: WO2017/113592
PCT Pub. Date: Jul. 6, 2017

(65) Prior Publication Data
US 2018/0210897 A1     Jul. 26, 2018

(30) Foreign Application Priority Data

Dec. 31, 2015  (CN) .......................... 2015 1 1025975

(51) Int. Cl.
*G06F 16/58*     (2019.01)
*G06N 20/00*    (2019.01)
(Continued)

(52) U.S. Cl.
CPC ............ *G06F 16/58* (2019.01); *G06F 16/313* (2019.01); *G06F 16/35* (2019.01); *G06F 16/532* (2019.01);
(Continued)

(58) Field of Classification Search
CPC ...... G06F 16/58; G06F 16/583; G06F 16/313; G06F 16/35; G06F 16/532; G06F 16/951; G06N 20/00
(Continued)

(56) References Cited

U.S. PATENT DOCUMENTS 7,716,225 B1 *   5/2010   Dean .................... G06F 17/2235
                                                                  707/748
8,078,617 B1 *  12/2011   Neveitt ................. G06F 16/335
                                                                  707/732
(Continued)

FOREIGN PATENT DOCUMENTS

CN      101582080 A       11/2009
CN      102902821 A        1/2013
(Continued)

OTHER PUBLICATIONS

International Search Report for PCT/CN2016/084312 dated Sep. 28, 2016 and its English translation provided by WIPO.
(Continued)

*Primary Examiner* — Evan Aspinwall
(74) *Attorney, Agent, or Firm* — Ladas & Parry, LLP (57) ABSTRACT

The present invention provides a model generation method, word weighting method, device, apparatus, and computer storage medium. In one aspect, the embodiments of the present invention obtain other images that are identical to a specified image, and use the specified image and said other images as sample images; and then obtain a text clustering based on the texts of the sample images; and then obtain text
(Continued)

features based on the text clustering and obtaining visual features based on the sample images; and carry out machine learning based on the text features and the visual features to generate a first regression model and a first sorting model for word weighting on words in the text of an image. The embodiments of the present invention therefore can improve the accuracy of the word weighting result in an image text, thus improving the accuracy of an image search result.

7 Claims, 9 Drawing Sheets

(51) Int. Cl.
    *G06F 16/35*     (2019.01)
    *G06F 16/31*     (2019.01)
    *G06F 16/951*     (2019.01)
    *G06F 16/583*     (2019.01)
    *G06F 16/532*     (2019.01)

(52) U.S. Cl.
    CPC .......... *G06F 16/583* (2019.01); *G06F 16/951* (2019.01); *G06N 20/00* (2019.01)

(58) Field of Classification Search
    USPC ........................................................ 707/737
    See application file for complete search history.

(56) References Cited

U.S. PATENT DOCUMENTS

| | | | | |
|---|---|---|---|---|
| 8,880,438 | B1* | 11/2014 | Liu | G06N 5/02 |
| | | | | 706/12 |
| 9,305,099 | B1* | 4/2016 | Dean | G06F 17/2235 |
| 2006/0026152 | A1 | 2/2006 | Zeng et al. | |
| 2007/0192350 | A1 | 8/2007 | Gao et al. | |
| 2011/0125743 | A1* | 5/2011 | Immonen | G06F 16/29 |
| | | | | 707/737 |
| 2013/0198186 | A1* | 8/2013 | Parakhin | G06F 16/90335 |
| | | | | 707/737 |
| 2015/0055854 | A1* | 2/2015 | Marchesotti | G06K 9/627 |
| | | | | 382/159 |

FOREIGN PATENT DOCUMENTS

| | | |
|---|---|---|
| CN | 103577537 A | 2/2014 |
| CN | 103810274 A | 5/2014 |
| CN | 104077419 A | 10/2014 |
| CN | 104376105 A | 2/2015 |
| JP | 2000048041 A | 2/2000 |
| JP | 2000353173 A | 12/2000 |
| JP | 2011221794 A | 11/2011 |
| JP | 2013544397 A | 12/2013 |
| JP | 2013545160 A | 12/2013 |
| JP | 2015197915 A | 11/2015 |

OTHER PUBLICATIONS

Written Opinion of the International Search Authority for PCT/CN2016/084312 dated Sep. 28, 2016 and its English translation provided by WIPO.
Notification to Grant Patent Right for Invention from CN app. No. 201511025975.0, dated Oct. 25, 2018, with English translation provided by Global Dossier.
First Office Action from CN app. No. 201511025975.0, dated Jun. 4, 2018, with machine English translation provided by Google Translate.
Decision to Grant a Patent from JP app. No. 2016-572673, dated Oct. 2, 2018, with machine English translation provided by Global Dossier.
Notice of Reasons for Refusal from JP app. No. 2016-572673, dated Mar. 20, 2018, with machine English translation.
International Preliminary Report on Patentability from PCT/CN2016/084312, dated Jul. 3, 2018, with English translation from WIPO.

* cited by examiner

MODEL GENERATION METHOD, WORD WEIGHTING METHOD, DEVICE, APPARATUS, AND COMPUTER STORAGE MEDIUM

CROSS-REFERENCE TO RELATED APPLICATIONS

The present application is the U.S. national phase of PCT Application PCT/CN2016/084312 filed on Jun. 1, 2016, which claims the priority of Chinese Patent Application No. 201511025975.0, entitled "Model Generation Method and Apparatus, Word Weighting Method and Apparatus", filed on Dec. 31, 2015, the disclosures of which are hereby incorporated by reference in their entireties.

TECHNICAL FIELD

The invention relates to the field of network application, specifically to a model generation method, word weighting method, device, apparatus, and computer storage medium.

BACKGROUND

An image search process includes: the user input the query terms, and then the image search engine finds, from an image set, an image search result matching the query terms, and sort the image search result and provide to the user. An image search engine is an information retrieval tool used to search internet images. At present, during image searching, the image search engine needs to calculate the correlation between the query terms and the candidate images. The correlation is calculated based on the weights of the words in the query term and the weights of the words in the texts of candidate images. Herein, the weights of respective words in the text of a candidate image are obtained by the word weighting technique. It can be seen that the effect of word-weighting will directly affect the correlation calculation, thus affecting the accuracy of image search results.

In the prior art, since the text of an image is generally short, when carrying out word weighting on the words of an image, the prior art does word weighting on words of the text generally based on the short text of the image, so that the accuracy of the word weighting result is low, eventually leading to low accuracy of image search results.

SUMMARY

In view of the above, the present invention provides a model generation method, word weighting method, device, apparatus, and computer storage medium, which improves the accuracy of the word weighting result of the words in the text of an image, and thus improves the accuracy of image search results.

One aspect of embodiments of the present invention provides a model generation method, comprising:
  obtaining other images that are identical to a specified image, and using the specified image and said other images as sample images;
  obtaining a text clustering based on the texts of the sample images;
  obtaining text features based on the text clustering and obtaining visual features based on the sample images;
  carrying out machine learning based on the text features and the visual features to generate a first regression model and a first sorting model.

As the aforementioned aspects and any possible implementations, an implementation is further provided, wherein the step of obtaining other images that are identical to a specified image comprises:
  obtaining signatures of the specified image and respective candidate images;
  obtaining similarity degrees between the specified image and the respective candidate images based on the signatures of the specified image and the respective candidate images;
  extracting candidate images whose similarity degrees are greater than or equal to a preset similarity threshold as other images that are identical to the specified image.

As the aforementioned aspects and any possible implementations, an implementation is further provided, wherein prior to the step of obtaining text features based on the text clustering and obtaining visual features based on the sample images, the method further comprises:
  filtering the texts in the text clustering based on at least one of: authoritative data of the sites or pages where the respective sample images are located, time information of the pages where the respective sample images are located, click data of the sites where the respective sample images are located, and distances between word vectors of the texts of respective sample images and a word vector of the text clustering, so as to obtain a filtered text clustering.

As the aforementioned aspects and any possible implementations, an implementation is further provided, wherein the text features comprises at least one of the following features:
  distribution features of respective texts in the text clustering;
  click features of respective texts in the text clustering;
  semantic features of words in respective texts in the text clustering;
  keywords of respective texts in the text clustering; and
  priori attributes of words in respective texts in the text clustering.

As the aforementioned aspects and any possible implementations, an implementation is further provided, wherein the method further comprises:
  obtaining regression scores for respective words in the texts of the respective sample images using the first regression model;
  obtaining a sorting result of respective words in the texts of the respective sample images using the first sorting model;
  obtaining relevant features of respective images in an image search result matching respective words in the texts of the respective sample images;
  generating a second regression model and a second sorting model based on the regression scores, the sorting result, and the relevant features.

As the aforementioned aspects and any possible implementations, an implementation is further provided, wherein the relevant features comprises at least one of the following features:
  user behavior features of respective images in the image search result matching respective words in the texts of the respective sample images, quality features of said respective images, and authoritative data of the sites or pages where said respective images are located.

One aspect of embodiments of the invention provides a word weighting method, comprising:
  obtaining first regression scores for respective words in a text of a specified image using a first regression model based on the text of the specified image, the first
regression model being generated using the aforementioned model generation method;

obtaining a first sorting result of respective words in the text of the specified image using a first sorting model based on the text of the specified image, the first sorting model being generated using the aforementioned model generation method;

obtaining weighting scores of respective words in the text of the specified image based on the first regression scores and the first sorting result.

As the aforementioned aspects and any possible implementations, an implementation is further provided, wherein the step of obtaining weighting scores of respective words in the text of the specified image based on the first regression scores and the first sorting result comprises:

calculating weighting scores for respective words in the text of the specified image using a weighting function based on the first regression scores and the first sorting result.

As the aforementioned aspects and any possible implementations, an implementation is further provided, wherein the step of obtaining weighting scores of respective words in the text of the specified image based on the first regression scores and the first sorting result comprises:

obtaining second regression scores for respective words in the text of the specified image using a second regression model based on the first regression scores and the first sorting result, the second regression model being generated using the aforementioned model generation method;

obtaining a second sorting result of respective words in the text of the specified image using a second sorting model based on the first regression scores and the first sorting result, the second sorting model being generated using the aforementioned model generation method;

obtaining weighting scores of respective words in the text of the specified image using a weighting function based on the second regression scores and the second sorting result.

One aspect of embodiments of the invention provides a model generation device comprises:

an image obtaining unit, for obtaining other images that are identical to a specified image, and using the specified image and said other images as sample images;

a text clustering unit, for obtaining a text clustering based on the texts of the sample images;

a first feature obtaining unit, obtaining text features based on the text clustering and obtaining visual features based on the sample images;

a first generating unit, for carrying out machine learning based on the text features and the visual features to generate a first regression model and a first sorting model.

As the aforementioned aspects and any possible implementations, an implementation is further provided, wherein the image obtaining unit is specifically used for:

obtaining signatures of the specified image and respective candidate images;

obtaining similarity degrees between the specified image and the respective candidate images based on the signatures of the specified image and the respective candidate images;

extracting candidate images whose similarity degrees are greater than or equal to a preset similarity threshold as other images that are identical to the specified image.

As the aforementioned aspects and any possible implementations, an implementation is further provided, wherein the device further comprises:

a text processing unit, for filtering the texts in the text clustering based on at least one of: authoritative data of the sites or pages where the respective sample images are located, the time information of the pages where the respective sample images are located, click data of the sites where the respective sample images are located, and distances between word vectors of the texts of respective sample images and a word vector of the text clustering, so as to obtain a filtered text clustering.

As the aforementioned aspects and any possible implementations, an implementation is further provided, wherein the text features comprises at least one of the following features:

distribution features of respective texts in the text clustering;

click features of respective texts in the text clustering;

semantic features of words in respective texts in the text clustering;

keywords of respective texts in the text clustering; and priori attributes of words in respective texts in the text clustering.

As the aforementioned aspects and any possible implementations, an implementation is further provided, wherein the device further comprises:

a score obtaining unit, for obtaining regression scores for respective words in the texts of the respective sample images using the first regression model;

a sorting unit, for obtaining a sorting result of respective words in the texts of the respective sample images using the first sorting model;

a second feature obtaining unit, for obtaining relevant features of respective images in an image search result matching respective words in the texts of the respective sample images;

a second generating unit, for generating a second regression model and a second sorting model based on the regression scores, the sorting result, and the relevant features.

As the aforementioned aspects and any possible implementations, an implementation is further provided, wherein the relevant features comprises at least one of the following features:

user behavior features of respective images in the image search result matching respective words in the texts of the respective sample images, quality features of said respective images, and authoritative data of the sites or pages where said respective images are located.

One aspect of embodiments of the present invention provides a word weighting device, comprising:

a score obtaining unit, for obtaining first regression scores for respective words in a text of a specified image using a first regression model based on the text of the specified image, the first regression model being generated using the aforementioned model generation device;

a sorting unit, for obtaining a first sorting result of respective words in the text of the specified image using a first sorting model based on the text of the specified image, the first sorting model being generated using the aforementioned model generation device;

a word weighting unit, for obtaining weighting scores of respective words in the text of the specified image based on the first regression scores and the first sorting result.

As the aforementioned aspects and any possible implementations, an implementation is further provided, wherein the word weighting unit is specifically used for:

calculating weighting scores for respective words in the text of the specified image using a weighting function based on the first regression scores and the first sorting result.

As the aforementioned aspects and any possible implementations, an implementation is further provided, wherein the word weighting unit further comprises:

a score obtaining module, for obtaining second regression scores for respective words in the text of the specified image using a second regression model based on the first regression scores and the first sorting result, the second regression model being generated using the aforementioned model generation device;

a sorting module, for obtaining a second sorting result of respective words in the text of the specified image using a second sorting model based on the first regression scores and the first sorting result, the second sorting model being generated using the aforementioned model generation device;

a word weighting module, for obtaining weighting scores of respective words in the text of the specified image using a weighting function based on the second regression scores and the second sorting result.

As can be seen from the above technical solutions, the embodiments of the present invention have the following advantageous effects:

The present invention obtains other images that are identical to a specified image, and uses the specified image and said other images as sample images; and then obtains a text clustering based on the texts of the sample images; and then obtains text features based on the text clustering and obtaining visual features based on the sample images; and carries out machine learning based on the text features and the visual features to generate a first regression model and a first sorting model for word weighting on words in the text of an image. The present invention solves the problem that the accuracy of the word weighting result is relatively low due to the relatively short text of an image in the prior art, and therefore the embodiments of the present invention can improve the accuracy of the word weighting result in an image text, thus improving the accuracy of an image search result.

DETAILED DESCRIPTION

To show the object, technical solutions, and advantages of the embodiments of the invention more clearly, the technical solutions of the embodiments of the present invention will be described fully and clearly below in conjunction with the drawings of the embodiment of the invention.

It is clear that the described embodiments are only part, not all, of the embodiments of the present invention. Based on the embodiments of the present invention, all other embodiments made by one of ordinary skill in the art without creative labor are within the protection scope of the present invention.

The terminology used in embodiments of the present invention is for the purpose of describing particular embodiments only and is not intended to be limiting the present invention. The singular forms "a", "the", and "said" in the embodiments of the invention and the appended claims are intended to include the plural forms as well, unless the context clearly indicates otherwise.

As should be understood, the word "and/or" is merely a description of the associated relationship of associated objects, indicating that three kinds of relationship can exist, for example, A and/or B, can be expressed as: the presence of A alone, presence of both A and B, presence of B alone. In addition, the character "I" generally represents an "OR" relationship between the associated objects before and after the character.

It should be understood that although the words "first", "second", etc. may be used for describing regression models in the embodiments of the present invention, these regression models are not limited to these words. These words are only used to distinguish the regression models from each other. For example, a first regression model may also be referred to as a second regression model without departing from the scope of embodiments of the invention, and similarly, the second regression model may also be referred to as a first regression model.

Depending on the context, the word "if" used herein may be construed to mean "when" or "while" or "in response to a determined" or "in response to a detected". Similarly, depending on the context, the phrase "if it is determined" or "if it is detected" (stated condition or event) may be interpreted to mean "when it is determined" or "in response to a determined" or "when it is detected" or "in response to a detected" (stated condition or event).

Embodiment I

Figure 1:
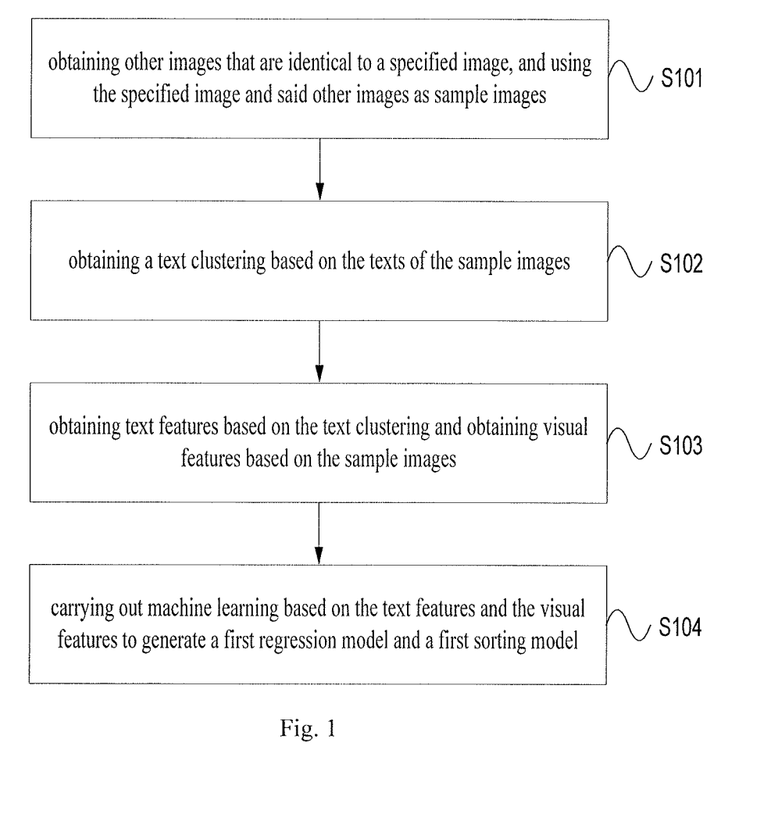
FIG. 1 is a flow chart of embodiment I of a model generation method according to an embodiment of the present invention.

The embodiment of the present invention provides a model generation method. Please refer to FIG. 1, which is a flowchart of embodiment I of a model generation method according to an embodiment of the present invention. As shown in the figure, the method includes the steps of:

S101. Obtaining other images that are identical to a specified image, and using the specified image and said other images as sample images.

Specifically, image search is significantly different from web search in that the text of an image is generally short, so one will encounter the problem of understanding a short text when facing the task of word weighting. One way to solve the problem is to add a preprocessing step for the weighting task, so as to cluster the texts of the image to obtain a rich and accurate text. The texts of the same image are aggregated, and the texts of the image are mutually authenticated by the result of the aggregation, so as to filter out credible and sufficient texts to improve the validity of the statistic features based the texts of the image.

Figure 2:
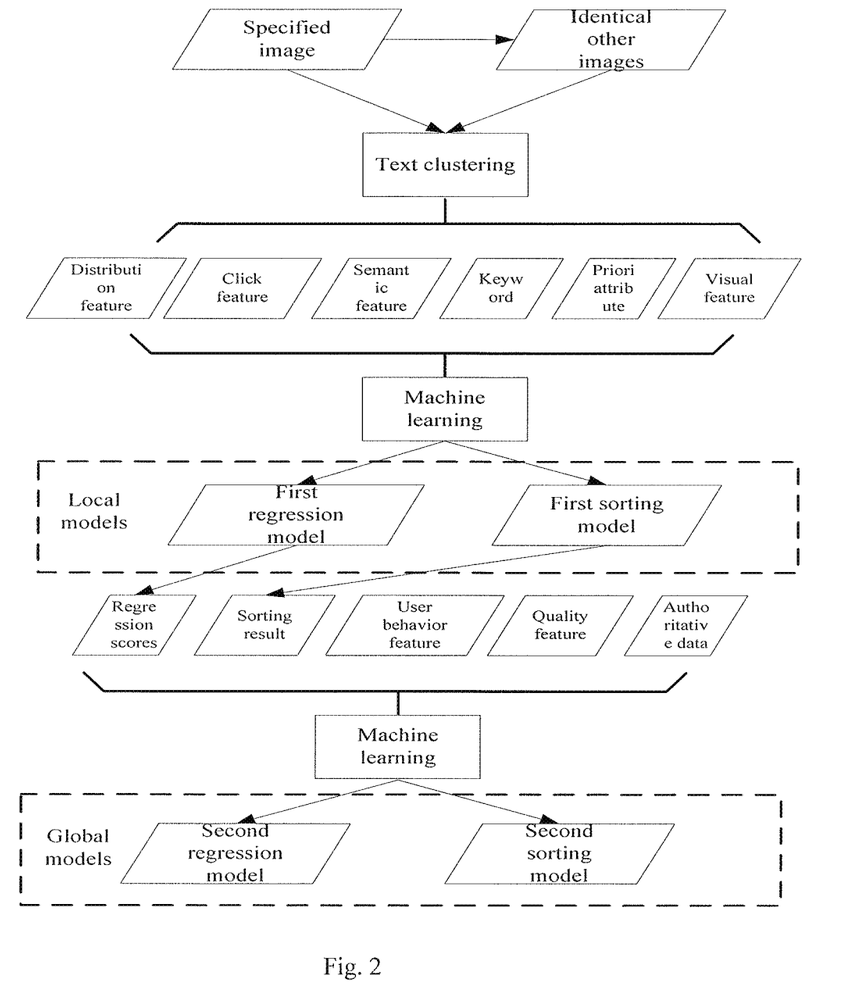
FIG. 2 is an exemplary diagram of generating a local model and global models according to an embodiment of the present invention.

As shown in FIG. 2, which is an exemplary diagram of generating a local model and global models according to an embodiment of the present invention. As shown in the figure, in the embodiment of the present invention, in order to realize text clustering of an image, it is necessary to obtain other images that are identical to the specified image, and then use the specified image and said other images as sample images in the embodiment of the present invention. Herein, the number of specified images may be one or more, and the number of other images that are identical to each specified image may be one or more.

By way of example, a method of obtaining other images that are identical to a specified image may include, but is not limited to:

First, the signature of the specified image is obtained by using the entire content of the specified image or the main feature of the specified image, and the signatures of respective candidate images in the image set are obtained by the same method. And then, one can obtain similarity degrees between the specified image and the respective candidate images based on the signatures of the specified image and the respective candidate images. The respective similarity degrees are compared with a preset similarity threshold, and then candidate images whose similarity degrees are greater than or equal to the preset similarity threshold are extracted as other images that are identical to the specified image. That is, the other images having signatures with similarity degrees greater than or equal to the similarity threshold are considered to be identical to the specified image. In this way, one obtains other images identical to the specified image.

S102. Obtaining a text clustering based on the texts of the sample images.

Specifically, as shown in FIG. 2, as to the obtained other images identical to the specified images, the text of the specified image and the texts of other images can be aggregated to obtain a text clustering.

It is understood that the text of the specified image or texts of other image may include, but not limited to, at least one of the title of the page where an image is located, the text displayed when the mouse hovers over an image, the title of an image, and the text in the page where an image is located.

As can be understood, text quality is different for different texts due to different text sources in the text clustering. Some pages, such as blogs and forum pages, have relatively low correlation between texts and corresponding images, so there will be noise if one does not filter the text clustering, direct use of the obtained text clustering will affect the accuracy of the generated model.

Figure 3:
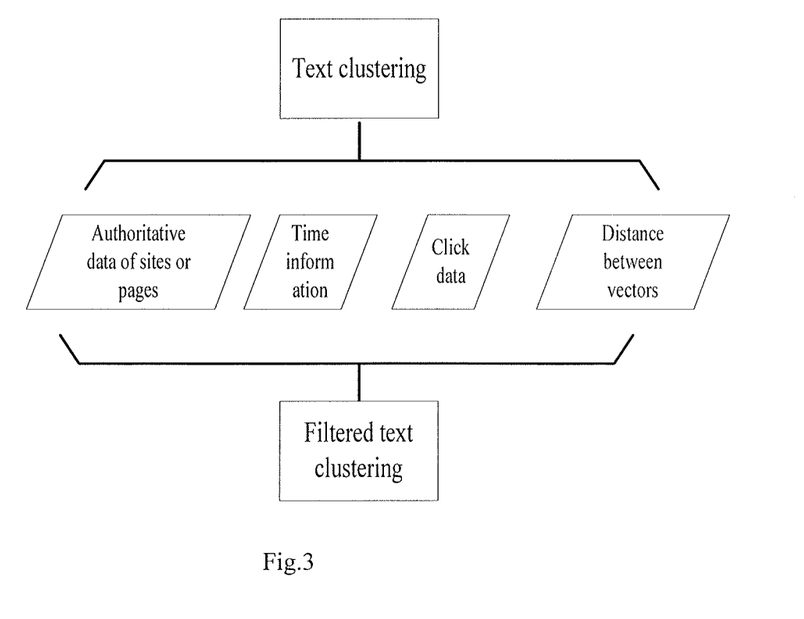
FIG. 3 is an exemplary diagram of a text clustering of images according to an embodiment of the present invention.

Please refer to FIG. 3, which is an exemplary diagram of a text clustering of images according to an embodiment of the present invention. As shown in FIG. 3, in an embodiment of the present invention, the method of filtering a text clustering may include but is not limited to: filtering the texts in the text clustering based on at least one of: authoritative data of the sites or pages where the respective sample images are located, time information of the pages where the respective sample images are located, click data of the sites where the respective sample images are located, and distances between word vectors of the texts of respective sample images and a word vector of the text clustering, so as to obtain a filtered text clustering. It can be considered that respective texts in the clustered text obtained through filtering are relatively good ones.

For example, authoritative data of the sites or pages where respective sample images are located is calculated and compared with the preset authoritative threshold, and the texts of the sample images whose authoritative data is less than the authoritative threshold are deleted from the text clustering.

For another example, since blogs, forums, and other pages often refer to images in other pages with earlier dates, it is possible to, based on the time information of the pages of the sample images, delete the texts from sample images in the pages with relative later dates and retain the pages from sample images in the pages with relative earlier dates in the text clustering.

For Another example, one can calculate the numbers of clicks of the sites where respective sample images are located, and compare the numbers of clicks with the predetermined threshold number of times, and delete the texts of the sample images with numbers of clicks smaller than the threshold.

As another example, the distances between the word vectors of the texts of respective sample images and the word vector of the text clustering are respectively calculated, and then the calculated distances are compared with a preset distance threshold to delete the texts of the sample images in the text clustering with distances greater than or equal to the distance threshold.

S103. obtaining text features based on the text clustering and obtaining visual features based on the sample images.

Specifically, one can obtain the text features based on the filtered text clustering, and obtain the visual features based on the sample images.

In an embodiment of the present invention, as shown in FIGS. 2 and 3, the text features may include at least one of the following features:

distribution features of respective texts in the text clustering;

click features of respective texts in the text clustering;

semantic features of words in respective texts in the text clustering;

keywords of respective texts in the text clustering; and priori attributes of words in respective texts in the text clustering.

For example, the distribution features of texts may include, but are not limited to, text fields for respective words in a text to occur in respective texts in the text clustering, the numbers of occurrences for respective words in a text to occur in the clustering, the numbers of occurrences for respective words in a text to occur in respective texts in the text clustering, the offset amounts for respective words in a text to occur in respective words in the text clustering, and the distribution features of respective words in a text at different levels of the sites or pages. Herein, the distribution features of respective words in a text at different levels of the sites or pages may include, but are not limited to, at least one of the following: the numbers of occurrences, occurring frequencies, the ratios of the numbers of occurrences to the maximum number of occurrences, the ratios of the numbers of occurrences to the mean value of the numbers of occurrences for respective words to occur in a text at respective levels of pages or sites.

If the query term is q, the user clicks the image p in the search result that matches the query term, q is called the click query text of the text of p, if the user also clicks on the image r, the text of r is the extended click text of the text of p. For example, the click features of the text may include, but are not limited to, the numbers of occurrences, the frequency of said occurrences, the ratios of the numbers of said occurrences to the maximum number of occurrences, the ratios of the numbers of occurrences to the mean value of the numbers of occurrences for respective words in the text to occur in the click query text and the extended click text.

For example, the semantic features of words in a text can include, but are not limited to, semantic categories of texts in text clustering, such as plants, animals, or stars.

For example, a text can be cut to obtain words in the text, and then a number of words with confidence greater than or equal to a confidence threshold are obtained from the respective words as the subject of the text.

For example, priori attributes of words in a text may include, but are not limited to, Inverse Document Frequency (IDF) data, semantic categories, words of common meaning, synonyms, words of similar meanings, and related words. In a specific implementation, the priori attributes of words can be extracted from corpus and/or user behavior logs.

In an embodiment of the invention, the visual features refer to features of a sample image in visual effect. For example, for a concert image of Liu, the visual features include "Liu", "concert" and "Celebrity". The visual features of a sample image can be obtained by machine learning of the content of the sample image and the user click log.

S104. carrying out machine learning based on the text features and the visual features to generate a first regression model and a first sorting model.

Specifically, as shown in FIG. 2, after obtaining text features and visual features, machine learning can be performed based on the text features and visual features to generate local models including a first regression model and a first sorting model.

As can be understood, the first regression model is used to obtain regression scores for respective words in the text of an image, the first sorting model is used to obtain sort scores for respective words in the text of the image, which are used to determine the order of the words in the text of the image. For example, the sorting scores of words A, B, and C are 0.3, −1, and 1.2, and the order among the words is "word C> word A> word B".

For example, text features and visual features may be machine-learned using the Gradient Boosting Decision Tree (GBDT) algorithm to generate a first regression model.

As another example, machine learning of text features and visual features may be performed using a Gradient Boosting Rank (GBRank) algorithm to generate a first sorting model.

Embodiment II

Figure 4:
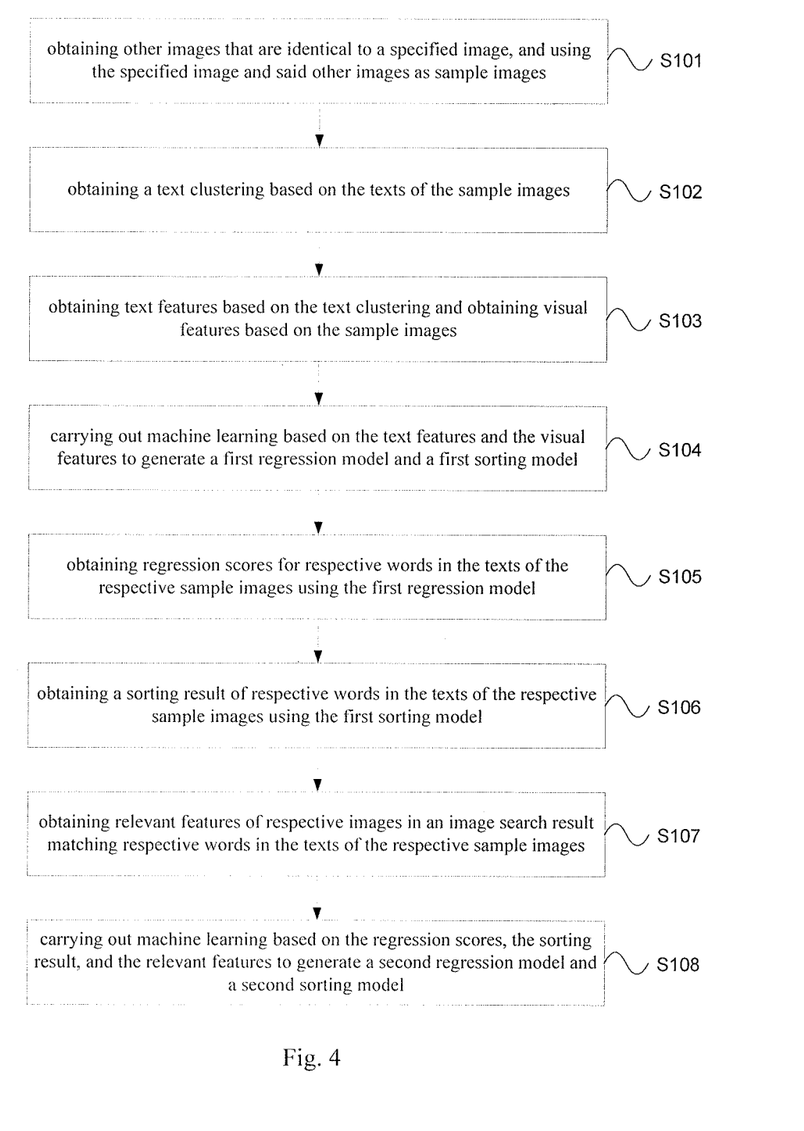
FIG. 4 is a flowchart of a second embodiment of a model generation method according to an embodiment of the present invention.

Please refer to FIG. 4, which is a schematic flowchart of a second embodiment of the model generation method according to an embodiment of the present invention, the method is based on the model generation method in Embodiment I, and the model generation method may comprise, after S104, steps of:

S105. Obtaining regression scores for respective words in the texts of the respective sample images using the first regression model;

S106. Obtaining a sorting result of respective words in the texts of the respective sample images using the first sorting model;

S107. Obtaining relevant features of respective images in an image search result matching respective words in the texts of the respective sample images;

S108. Generating a second regression model and a second sorting model based on the regression scores, the sorting result, and the relevant features.

As can be understood, the first regression model and the first sorting model generated in Embodiment I can only obtain the regression scores of the words in one text of the image and the sorting positions of the words in one text of the image, to obtain the regression scores of the words in different images and the sort positions of the same word in different images, it is necessary to further generate global models based on the local model, which includes the second regression model and the second sorting model.

In a specific implementation, as shown in FIG. 2, the texts of respective sample images may first be input into the first regression model, which outputs the regression scores of the words in the texts. Similarly, the texts of respective sample images are input to the first sorting model, and the first sorting model can output the sorting result of respective words in the texts.

In the present embodiment, it is also necessary to perform an image search with respective words in the texts of the respective sample images as the query term, to obtain an image search result matching the words in the texts of the respective sample images. And then one obtains relevant features of respective images in the image search result.

In this embodiment, the relevant features of images include at least one of the following: user behavior features of respective images in the image search result matching respective words in the texts of the respective sample images, quality features of said respective images, and authoritative data of the sites or pages where said respective images are located.

For example, the user behavior features of images may include, but are not limited to, click data for images in the image search result that matches the query term that contains words in the text and has an importance greater than the specified threshold. For example, the click data can include: the numbers of occurrences, occurring frequencies, occurrences, the ratios of the numbers of occurrences and the maximum number of occurrences, the ratios of the numbers of occurrences to the mean value of the numbers of occurrences.

For example, the quality features of an image may include, but are not limited to, the size of the image, the clarity of the image, the data indicating whether the image is fine (such as true and false), whether the link of the image is a dead link, whether the link of the image is external connection, etc.

For example, the authoritative data for the sites or pages on which the image are located may include, but are not limited to, the absolute values of authority of the sites or pages where the images are located, the ratio of the absolute values to the maximum absolute value, etc.

In a specific implementation, as shown in FIG. 2, after obtaining the relevant features of the images in the image search results matched with the words in texts of the respective sample images, it is possible to carry out machine learning and generated global models based on the regression scores of respective words, the sorting result of the respective words, and the related features of respective images in the image search results matched with the words in the texts of the respective sample images, the global model includes a second regression model and a second ordering model.

As can be understood, the second regression model is used to obtain the respective regression scores for the same word corresponding to the texts of different images, and the second sorting model is used to obtain the sorting scores when the same word corresponds to texts of different images, the sorting scores are used for sorting when the word corresponds to the texts of different images. For example, the sorting scores of the word s in the text A, the word s in the text B, and the word s in the text C are 0.3, −1, and 1.2, respectively, and the sorting is "word s in the text C">"word s in the text A">"word sin text B".

For example, machine learning may be performed using the GBDT algorithm, on the regression scores for respective words, the sorting result for respective words, and the relevant features of the images in the image search result that matches the words in respective sample images to generate a second regression model.

As another example, machine learning can be performed, using the GBRank algorithm, on the regression score for respective words, the sorting results for respective words, and the relevant features of the images in the image search result that matches the words in the texts of the respective sample images to generate a second sorting model.

Embodiment III

Figure 5:
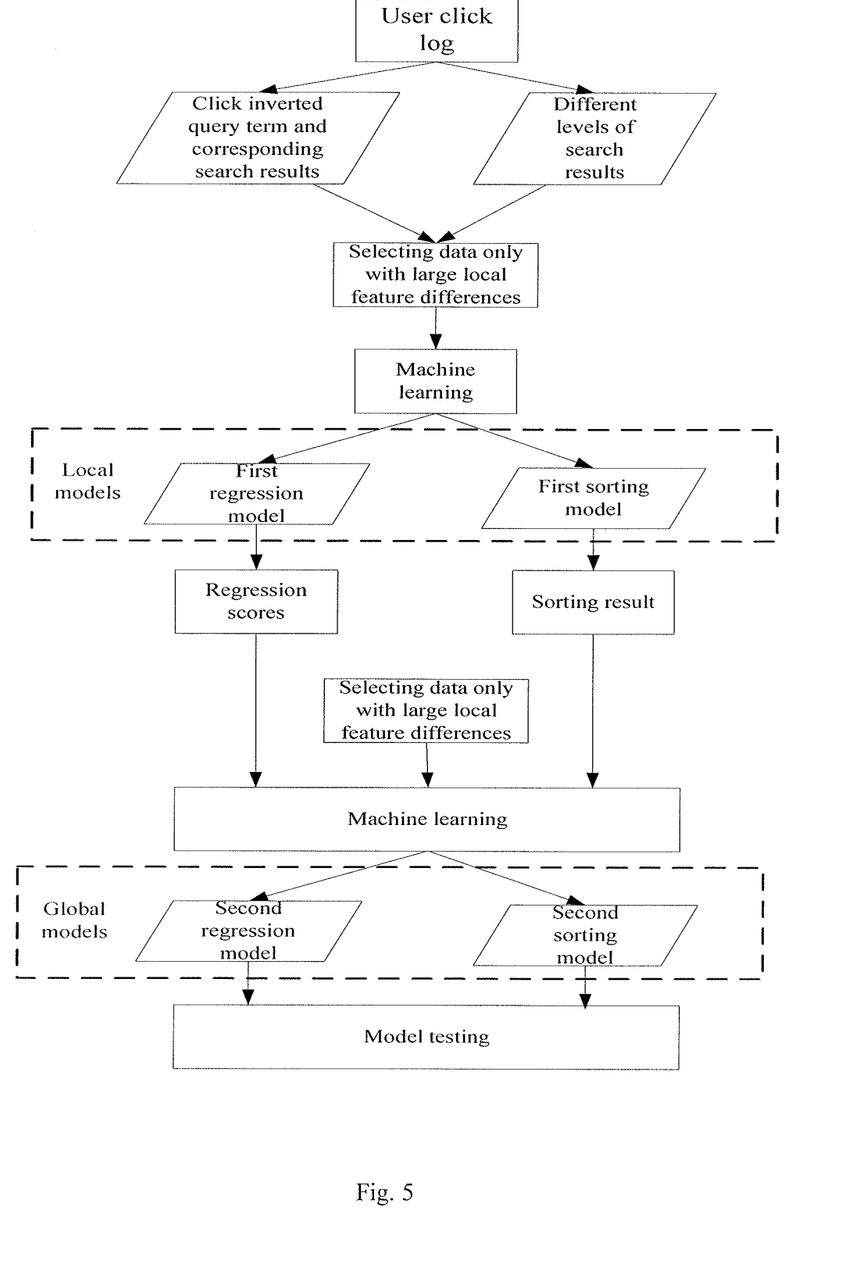
FIG. 5 is an exemplary diagram of generation a model using click features according to an embodiment of the present invention.

Please refer to FIG. 5, which is an exemplary diagram according to an embodiment of the present invention that utilizes click features to generate a model, as shown in the figure, using click features to generate model may include the following process:

First, user click logs including a query term "query" that is a single word is selected from the user click logs.

Second, based on the selected user click logs, the click inverted query term and the corresponding search results are selected as the candidate data. At the same time, based on click information of search results, one can divide the search results into different levels. Using the selected inverted query terms and the corresponding search results and the divided different levels of search result to obtain a data set: data_a.

Then, based on features used in the sorting and resorting of the search system, the data only with large local feature differences in the candidate data are selected as the training data used in generating the first sorting model in the local model, and the quality of the filtered data is closely related to the features used in the local model. At the same time, different levels of search results can be used as training data for generating the first regression model in the local model; these two training data can be recorded as the local training data (train_local).

Next, machine learning is performed using train_local to generate local models, including the first regression model and the first sorting model.

Then, the local regression model is used to obtain the regression scores and sorting result of data_a. The regression scores and sorting result are added to the data set data_a to obtain the data set data_b. The local model scores are obtained using a weighting function based on the regression scores and sorting result.

Then, the data only with small differences in local feature among the candidate data in the data set data_a are selected. The data only with small local feature differences, regression scores, and sorting result are taken as the training data of the second regression model and the second sorting model of the global models, that is, global training data train_global.

Machine learning is then performed using train_global to generate global models including the second regression model and the second order model.

Finally, we one use local models and global models obtained through learning to weight texts of the test images in the test set evaluate the effect of the test.

Example IV

Figure 6:
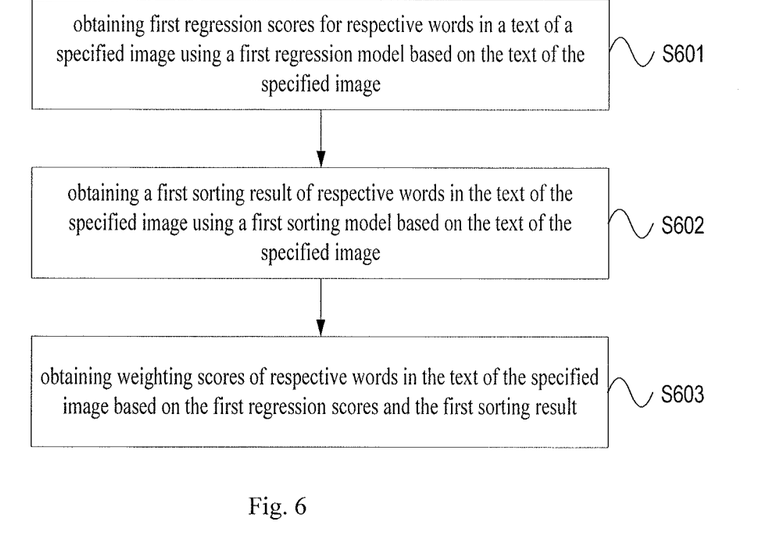
FIG. 6 is a flow diagram of a word weighting method according to an embodiment of the present invention.

Please refer to FIG. 6, which is a flowchart of a word weighting method according to an embodiment of the present invention, and as shown in the figure, the method may include the following steps:

S601. obtaining first regression scores for respective words in a text of a specified image using a first regression model based on the text of the specified image, the first regression model being generated using the model generation method of Embodiment I;

Specifically, the text of the specified image, the text features of the specified image, and the visual features of the specified image are input to the first regression model generated in the embodiment I, and the first regression model obtains the first regression scores of the words in the text of the specified image according to the input information.

S602: obtaining a first sorting result of respective words in the text of the specified image using a first sorting model based on the text of the specified image, the first sorting model being generated using the model generation method of embodiment I;

Specifically, the text of the specified image, the text features of the specified image, and the visual features of the specified image are input to the first sorting model generated in the embodiment I, and the first sorting model obtains the first sorting result of the words in the text of the specified image based on the input information.

S603. Obtaining weighting scores of respective words in the text of the specified image based on the first regression scores and the first sorting result.

Specifically, the method of obtaining weighting scores for respective words in the text of the specified image using the first regression score and the first sorting result may include, but is not limited to, the following:

First: calculating weighting scores for respective words in the text of the specified image using a weighting function based on the first regression scores and the first sorting result. Here, the fitting result of the first regression score and the first sorting result may be mapped into the specified interval using the weighting function, for example, the specified interval is 0 to 100.

Second, if the second regression model and the second sorting model are also generated in the above-described model generation method, one can obtain second regression scores for respective words in the text of the specified image based on the first regression score and the first sorting result using the second regression model; and one can obtain a second sorting result for respective words in the text of the specified image based on the first regression scores and the first ordering result and using a second sorting model; and finally, one can calculate weighted scores of the words in the text of the specified image based on the second regression scores and the second sorting result using a weighting function.

It should be noted that the technical solution provided by the above-described embodiment of the present invention is applicable not only to the text of an image but also to the texts of other network resources on the Internet such as the text of an ordinary page and the text of a multimedia resource. The present invention uses the text of the image as an example for exemplary diagram.

Embodiments of the present invention further provide device embodiments for implementing the steps and methods of the above-described method embodiments.

Figure 7:
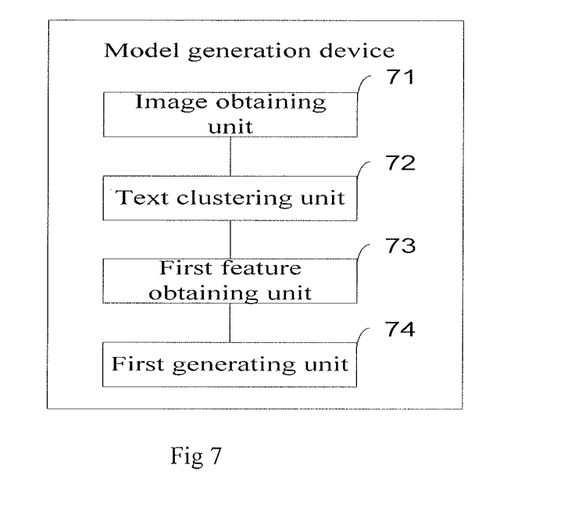
FIG. 7 is a functional block diagram of a first embodiment of a model generation device according to an embodiment of the present invention.

Please refer to FIG. 7, which is a functional block diagram of a first embodiment of a model generation device according to an embodiment of the present invention. As shown in the figure, the device comprises:

an image obtaining unit 71, for obtaining other images that are identical to a specified image, and using the specified image and said other images as sample images;

a text clustering unit 72, for obtaining a text clustering based on the texts of the sample images;

a first feature obtaining unit 73, obtaining text features based on the text clustering and obtaining visual features based on the sample images;

a first generating unit 74, for carrying out machine learning based on the text features and the visual features to generate a first regression model and a first sorting model.

In a specific implementation, the image obtaining unit 71 is specifically configured for:

obtaining signatures of the specified image and respective candidate images;

obtaining similarity degrees between the specified image and the respective candidate images based on the signatures of the specified image and the respective candidate images;

extracting candidate images whose similarity degrees are greater than or equal to a preset similarity threshold as other images that are identical to the specified image.

Figure 8:
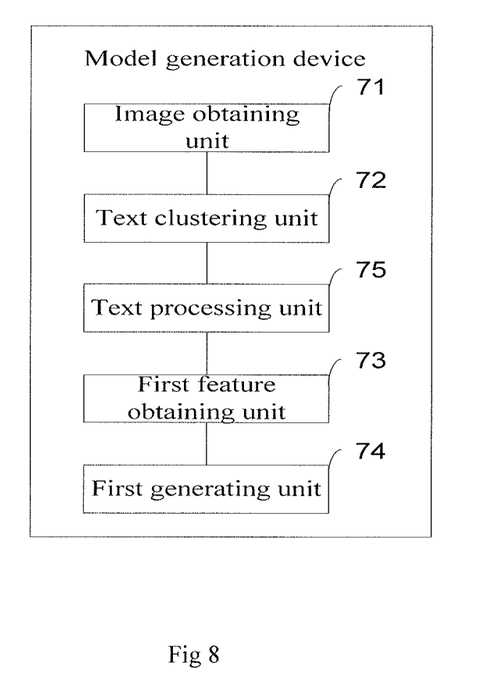
FIG. 8 is a functional block diagram of a second embodiment of a model generation device according to an embodiment of the present invention.

Please refer to FIG. 8, which is a functional block diagram of a second embodiment of the model generation device according to an embodiment of the present invention. As shown in the figure, the apparatus further comprises:

a text processing unit 75, for filtering the texts in the text clustering based on at least one of: authoritative data of the sites or pages where the respective sample images are located, the time information of the pages where the respective sample images are located, click data of the sites where the respective sample images are located, and distances between word vectors of the texts of respective sample images and a word vector of the text clustering, so as to obtain a filtered text clustering.

In a particular implementation, the text features include at least one of the following features:

distribution features of respective texts in the text clustering;
click features of respective texts in the text clustering;
semantic features of words in respective texts in the text clustering;
keywords of respective texts in the text clustering; and
priori attributes of words in respective texts in the text clustering.

Figure 9:
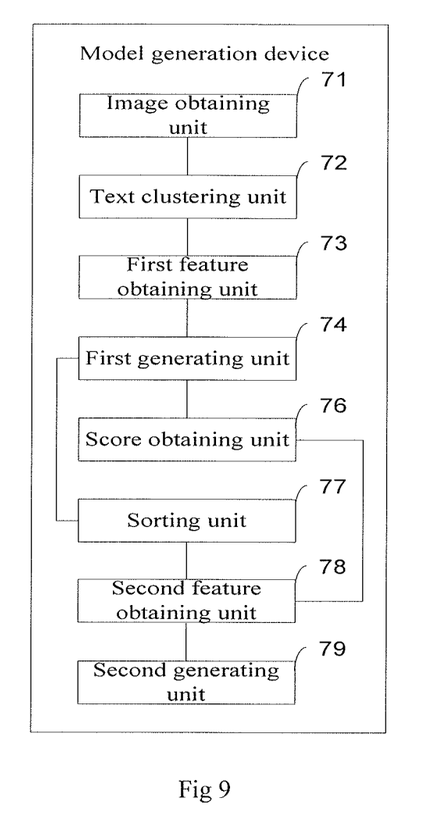
FIG. 9 is a functional block diagram of a third embodiment of the model generation device according to an embodiment of the present invention.

Please refer to FIG. 9 which is a functional block diagram of a third embodiment of the model generation device according to an embodiment of the present invention. As shown in the figure, the apparatus further comprises:

a score obtaining unit 76, for obtaining regression scores for respective words in the texts of the respective sample images using the first regression model;

a sorting unit 77, for obtaining a sorting result of respective words in the texts of the respective sample images using the first sorting model;

a second feature obtaining unit 78, for obtaining relevant features of respective images in an image search result matching respective words in the texts of the respective sample images;

a second generating unit 79, for generating a second regression model and a second sorting model based on the regression scores, the sorting result, and the relevant features.

In a particular implementation, the relevant features comprises at least one of the following features:

user behavior features of respective images in the image search result matching respective words in the texts of the respective sample images, quality features of said respective images, and authoritative data of the sites or pages where said respective images are located.

Figure 10:
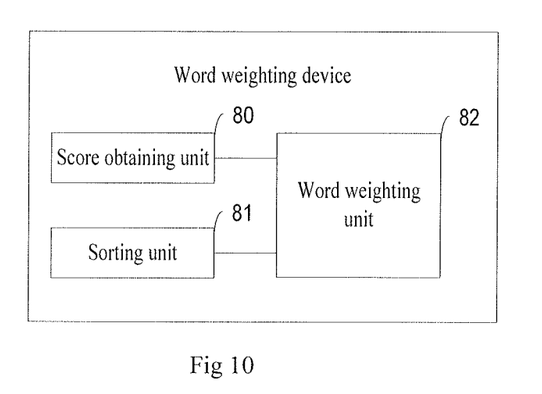
FIG. 10 is a functional block diagram of a first embodiment of a word weighting device according to an embodiment of the present invention.

Please refer to FIG. 10, which is a functional block diagram of a first embodiment of a word weighting device according to an embodiment of the present invention. As shown in the figure, the device comprises:

a score obtaining unit 80, for obtaining first regression scores for respective words in a text of a specified image using a first regression model based on the text of the specified image, the first regression model being generated using the model generation device as shown in FIGS. 7 and 8;

a sorting unit 81, for obtaining a first sorting result of respective words in the text of the specified image using a first sorting model based on the text of the specified image, the first sorting model being generated using the model generation device as shown in FIGS. 7 and 8;

a word weighting unit 82, for obtaining weighting scores of respective words in the text of the specified image based on the first regression scores and the first sorting result.

In a specific implementation, the word weighting unit is specifically used for:

calculating weighting scores for respective words in the text of the specified image using a weighting function based on the first regression scores and the first sorting result.

Figure 11:
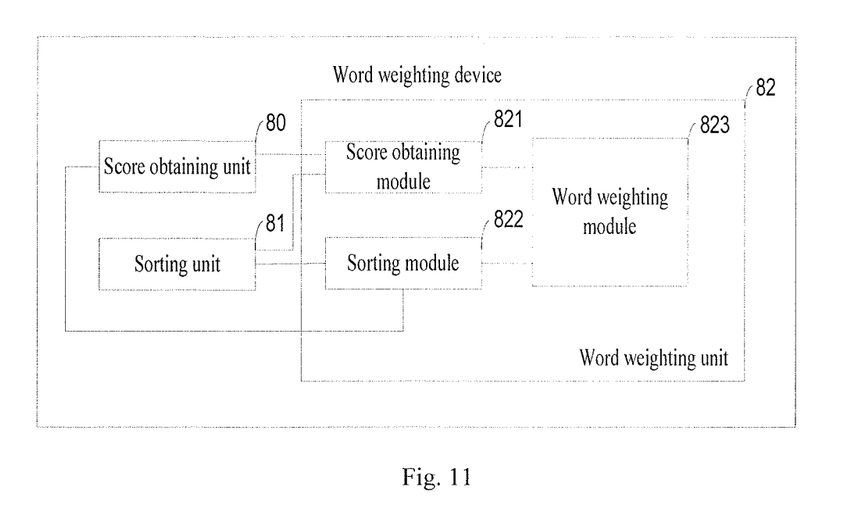
FIG. 11 is a functional block diagram of a second embodiment of a word weighting device according to an embodiment of the present invention.

Please refer to FIG. 11, which is a functional block diagram of a second embodiment of a word weighting device provided in the embodiment of the present invention. As shown in the figure, the word weighting unit 82 further comprises:

a score obtaining module 821, for obtaining second regression scores for respective words in the text of the specified image using a second regression model based on the first regression scores and the first sorting result, the second regression model being generated using the model generation device of FIG. 9;

a sorting module 822, for obtaining a second sorting result of respective words in the text of the specified image using a second sorting model based on the first regression scores and the first sorting result, the second sorting model being generated using the model generation device of FIG. 9;

a word weighting module 823, for obtaining weighting scores of respective words in the text of the specified image using a weighting function based on the second regression scores and the second sorting result.

The technical proposal of the embodiment of the invention has the following beneficial effects:

The present invention obtains other images that are identical to a specified image, and uses the specified image and said other images as sample images; and then obtains a text clustering based on the texts of the sample images; and then obtains text features based on the text clustering and obtaining visual features based on the sample images; and carries out machine learning based on the text features and the visual features to generate a first regression model and a first sorting model for word weighting on words in the text of an image.

In the technical solution according to an embodiment of the invention, the text of the image is clustered to obtain a plurality of texts, and then a plurality of features are extracted based on the text clustering of the images, and then the machine learning of the various features is carried out to generate required models, which can be used to weight words in the text of an image. The present invention solves the problem that the accuracy of the word weighting result is relatively low due to the relatively short text of an image in the prior art, and therefore the embodiments of the present invention can improve the accuracy of the word weighting result in an image text, thus improving the accuracy of an image search result.

Those skilled in the art can clearly understand that, for convenience and simplicity of description, the specific working processes of the aforementioned systems, devices, and units can be understood with references to the corresponding processes of the above embodiments, whose detailed description will not be repeated here.

As should be understood, in the various embodiments of the present invention, the disclosed systems, devices, and methods can be implemented through other ways. For example, the embodiments of the devices described above are merely illustrative. For example, the division of the units is only a logical functional division, the division may be done in other ways in actual implementations, for example, a plurality of units or components may be combined or be integrated into another system, or some features may be ignored or not implemented. Additionally, the displayed or discussed coupling or direct coupling or communicating connection between one and another may be indirect coupling or communicating connection through some interface, device, or unit, which can be electrical, mechanical, or of any other forms.

The units described as separate members may be or may be not physically separated, the components shown as units may or may not be physical units, which can be located in one place, or distributed in a number of network units. One can select some or all of the units to achieve the purpose of the embodiments according to the embodiment of the actual needs.

Further, in the embodiment of the present invention, the functional units in each embodiment may be integrated in a processing unit, or each unit may be a separate physical existence, or two or more units can be integrated in one unit. The integrated units described above can be used both in the form of hardware, or in the form of software plus hardware.

The aforementioned integrated unit implemented in the form of software may be stored in a computer readable storage medium. Said functional units of software are stored in a storage medium, including a number of instructions to instruct a computer device (it may be a personal computer, server, or network equipment, etc.) or processor to perform some steps of the method described in various embodiments of the present invention. The aforementioned storage medium includes: U disk, removable hard disk, read-only memory (ROM), a random access memory (RAM), magnetic disk, or an optical disk medium may store program code.

Finally, as should be noted, the above embodiments are merely preferred embodiments of the present invention, not intended to limit them; any modifications or replacements within the spirit of the present invention falls into the scope of the present invention.

We claim:

1. A word weighting method for an image search engine, wherein the method comprises:

obtaining first regression scores for respective words in a text of a specified image using a first regression model based on the text of the specified image;

obtaining a first sorting result of respective words in the text of the specified image using a first sorting model based on the text of the specified image;

obtaining weighting scores of respective words in the text of the specified image based on the first regression scores and the first sorting result, calculating, by the image search engine, correlation between a query term and the specified image based on the weighting scores, wherein the first regression model and the first sorting model are generated by:

obtaining other images that are identical to a specified image, and using the specified image and said other images as sample images;

obtaining a text clustering based on the texts of the sample images;

obtaining text features based on the text clustering and obtaining visual features based on the sample images;

carrying out machine learning based on the text features and the visual features to generate the first regression model and the first sorting model.

2. The method according to claim 1, wherein the step of obtaining weighting scores of respective words in the text of the specified image based on the first regression scores and the first sorting result comprises:

calculating weighting scores for respective words in the text of the specified image using a weighting function based on the first regression scores and the first sorting result.

3. The method according to claim 1, wherein the step of obtaining weighting scores of respective words in the text of the specified image based on the first regression scores and the first sorting result comprises:

obtaining second regression scores for respective words in the text of the specified image using a second regression model based on the first regression scores and the first sorting result;

obtaining a second sorting result of respective words in the text of the specified image using a second sorting model based on the first regression scores and the first sorting result;

calculating weighting scores of respective words in the text of the specified image using a weighting function based on the second regression scores and the second sorting result, where the second regression model and the second sorting model being generated by obtaining regression scores for respective words in the texts of the respective sample images using the first regression model;

obtaining a sorting result of respective words in the texts of the respective sample images using the first sorting model;

obtaining relevant features of respective images in an image search result matching respective words in the texts of the respective sample images; and carrying out machine learning based on the regression scores, the sorting result, and the relevant features to generate a second regression model and a second sorting model.

4. An apparatus comprising
one or more processors;
a memory;
one or more programs, which are stored in the memory, and implement a word weighting method for an image search engine when executed by the one or more processors, wherein the word weighting method comprises:

obtaining first regression scores for respective words in a text of a specified image using a first regression model based on the text of the specified image;

obtaining a first sorting result of respective words in the text of the specified image using a first sorting model based on the text of the specified image;

obtaining weighting scores of respective words in the text of the specified image based on the first regression scores and the first sorting result;

calculating, by the image search engine, correlation between a query term and the specified image based on the weighting scores, wherein the first regression model and the first sorting model are generated by:

obtaining other images that are identical to a specified image, and using the specified image and said other images as sample images;

obtaining a text clustering based on the texts of the sample images;

obtaining text features based on the text clustering and obtaining visual features based on the sample images; and carrying out machine learning based on the text features and the visual features to generate a first regression model and a first sorting model.

5. A nonvolatile computer storage medium, encoded with programs, which, when executed by one or more processors of a computer, make the computer to implement a word weighting method for an image search engine, wherein the word weighting method comprises:

obtaining first regression scores for respective words in a text of a specified image using a first regression model based on the text of the specified image;

obtaining a first sorting result of respective words in the text of the specified image using a first sorting model based on the text of the specified image;

obtaining weighting scores of respective words in the text of the specified image based on the first regression scores and the first sorting result;

calculating, by the image search engine, correlation between a query term and the specified image based on the weighting scores, wherein the first regression model and the first sorting model are generated by:

obtaining other images that are identical to a specified image, and using the specified image and said other images as sample images;

obtaining a text clustering based on the texts of the sample images;

obtaining text features based on the text clustering and obtaining visual features based on the sample images; and carrying out machine learning based on the text features and the visual features to generate a first regression model and a first sorting model.

6. The apparatus according to claim 4, wherein the operation of obtaining weighting scores of respective words in the text of the specified image based on the first regression scores and the first sorting result comprises:

calculating weighting scores for respective words in the text of the specified image using a weighting function based on the first regression scores and the first sorting result.

7. The apparatus according to claim 4, wherein the operation of obtaining weighting scores of respective words in the text of the specified image based on the first regression scores and the first sorting result comprises:

obtaining second regression scores for respective words in the text of the specified image using a second regression model based on the first regression scores and the first sorting result;

obtaining a second sorting result of respective words in the text of the specified image using a second sorting model based on the first regression scores and the first sorting result;

calculating weighting scores of respective words in the text of the specified image using a weighting function based on the second regression scores and the second sorting result, where the second regression model and the second sorting model being generated by obtaining regression scores for respective words in the texts of the respective sample images using the first regression model;

obtaining a sorting result of respective words in the texts of the respective sample images using the first sorting model;

obtaining relevant features of respective images in an image search result matching respective words in the texts of the respective sample images; and carrying out machine learning based on the regression scores, the sorting result, and the relevant features to generate a second regression model and a second sorting model.

* * * * *